United States Patent [19]

Cunningham et al.

[11] 4,324,195

[45] Apr. 13, 1982

[54] TENDER FOR SUBMARINE CABLE

[75] Inventors: Frank D. Cunningham, Tequesta; Michael A. Witt, Palm Beach Gardens, both of Fla.; Robert M. Hill, Katy, Tex.

[73] Assignee: Perry Oceanographics, Inc., Riviera Beach, Fla.

[21] Appl. No.: 189,657

[22] Filed: Sep. 22, 1980

[51] Int. Cl.³ .............................................. B63F 8/00
[52] U.S. Cl. ................................ 114/312; 242/54 R; 405/191
[58] Field of Search ............. 242/54 R; 114/312, 322, 114/323–326, 244, 245, 230, 179–181, 294; 405/185, 190, 191; 9/8 R, 9

[56] References Cited

U.S. PATENT DOCUMENTS

| | | | |
|---|---|---|---|
| 1,220,825 | 3/1917 | Del Fungo-Giera | 114/257 |
| 1,228,756 | 6/1917 | Del Fungo-Giera | 114/257 |
| 2,223,198 | 11/1940 | Zittrich et al. | 174/127 |
| 2,599,200 | 6/1952 | Rogers | 114/179 |
| 2,953,799 | 9/1960 | Arnold | 15/104.3 |
| 3,074,083 | 1/1963 | Schirmer | 9/8 R |
| 3,480,907 | 11/1969 | King | 114/244 X |
| 3,534,423 | 10/1970 | Ratliff | 15/104.3 |
| 3,559,905 | 2/1971 | Palynchuk | 242/54 R |
| 3,573,348 | 4/1971 | Herrmann | 9/8 R X |
| 3,757,370 | 9/1973 | Seno et al. | 9/8 R |
| 3,880,103 | 4/1975 | Talkington | 405/185 |
| 3,928,885 | 12/1975 | Peterson et al. | 242/54 |
| 4,010,619 | 3/1977 | Hightower et al. | 174/28 |
| 4,164,195 | 8/1979 | Frigeni | 114/322 |
| 4,170,079 | 10/1979 | Holekamp | 9/8 R |

OTHER PUBLICATIONS

"Underwater Manipulating Vehicle 'Arcus'", Germany, Feb. 1980.

Primary Examiner—Sherman D. Basinger
Attorney, Agent, or Firm—Stevens, Davis, Miller & Mosher

[57] ABSTRACT

A device for underwater taking in and paying out of a submarine cable or tether feeding a remote controlled submarine. A stationary guide tube has a funnel above and below it for guiding a tether therethrough. The tether is moved by a power driven wheel projecting into the guide tube. A dome spaced above the guide tube is shaped to deflect the tether into an annular storage chamber around the tube.

12 Claims, 5 Drawing Figures

TENDER FOR SUBMARINE CABLE

FIELD OF THE INVENTION

This invention pertains to the field of marine engineering and more particularly to the field of remotely controlled unmanned submarines such as those used for inspection of underwater pipelines and drilling rigs. A submarine cable or tether cable is used to connect the submarine to a surface support unit such as a platform or ship. The present invention is used to pay out or take up the tether as the submarine moves away from or closer to the surface platform. This tender is suspended in the water under the surface unit and in operation is completely submerged close to the working depth of the submarine to which it is attached. This submarine may be a remote controlled vessel equipped with closed circuit television cameras or a one-atmosphere diving suit.

DESCRIPTION OF THE PRIOR ART

Remotely controlled submarines are now being used for various underwater tasks, especially those which would be difficult or dangerous for human divers. A multiconductor cable must be connected to the submarine to actuate its propulsion motors and cameras, as well as to send the camera signal back to the surface for viewing. This multiconductor cable, usually referred to as a tether, is controlled in length by a device for winding it up and paying it out in accordance with the movement of the submarine. The prior art usually utilizes a lift module with a primary tether going from the surface support unit to the module and a secondary tether connecting the lift module with the submarine.

The lift module usually contains an underwater winch or a bail arm which wraps the secondary tether on a spool much like a spinning reel on a fishing rod. Such underwater winches have slip rings to transmit power and signal and a level wind mechanism, both of which are expensive to build and difficult to maintain.

SUMMARY OF THE INVENTION

The tether tender of the present invention is designed to be suspended underwater beneath a surface support unit by a primary tether and has a secondary tether extending therefrom to a vessel such as a remote controlled submarine or a one atmosphere diving suit. The tender has an inner funnel with a generally vertical central guide tube and a similarly shaped inner dome above the funnel, that dome having a central portion which projects downwardly toward the guide tube opening. Both the funnel and the dome are outwardly curved and downwardly flared, connecting respectively to inner and outer walls which define an annular storage space between them. A driving means, preferably in the form of at least one rubber wheel, is associated with the central guide tube so as to frictionally engage the secondary tether cable passing therethrough, forcing that cable upwardly against the inner surface of the dome so that it will move in a circular path so as to become coiled in the annular storage space. Both the inner funnel and the dome are stationary, the only moving part being the tether driving means and, of course, the tether itself.

OBJECTS OF THE INVENTION

The principal object of the present invention is to provide a tender to pay out and take in a secondary submarine tether without the use of a winch or a bail arm and associated slip rings or level wind mechanisms.

Another object of the present invention is to provide a tether tender which has a minimum of moving parts, with those parts requiring a minimum amount of servicing.

A further object of this invention is to provide a basket which stores a secondary tender while preventing tangling thereof.

These and other objects of this invention will become more readily apparent from the following specification in which a preferred embodiment is described by way of example and not of limitation, when taken in connection with the attached drawings.

DESCRIPTION OF THE PREFERRED EMBODIMENT

Figure 1:
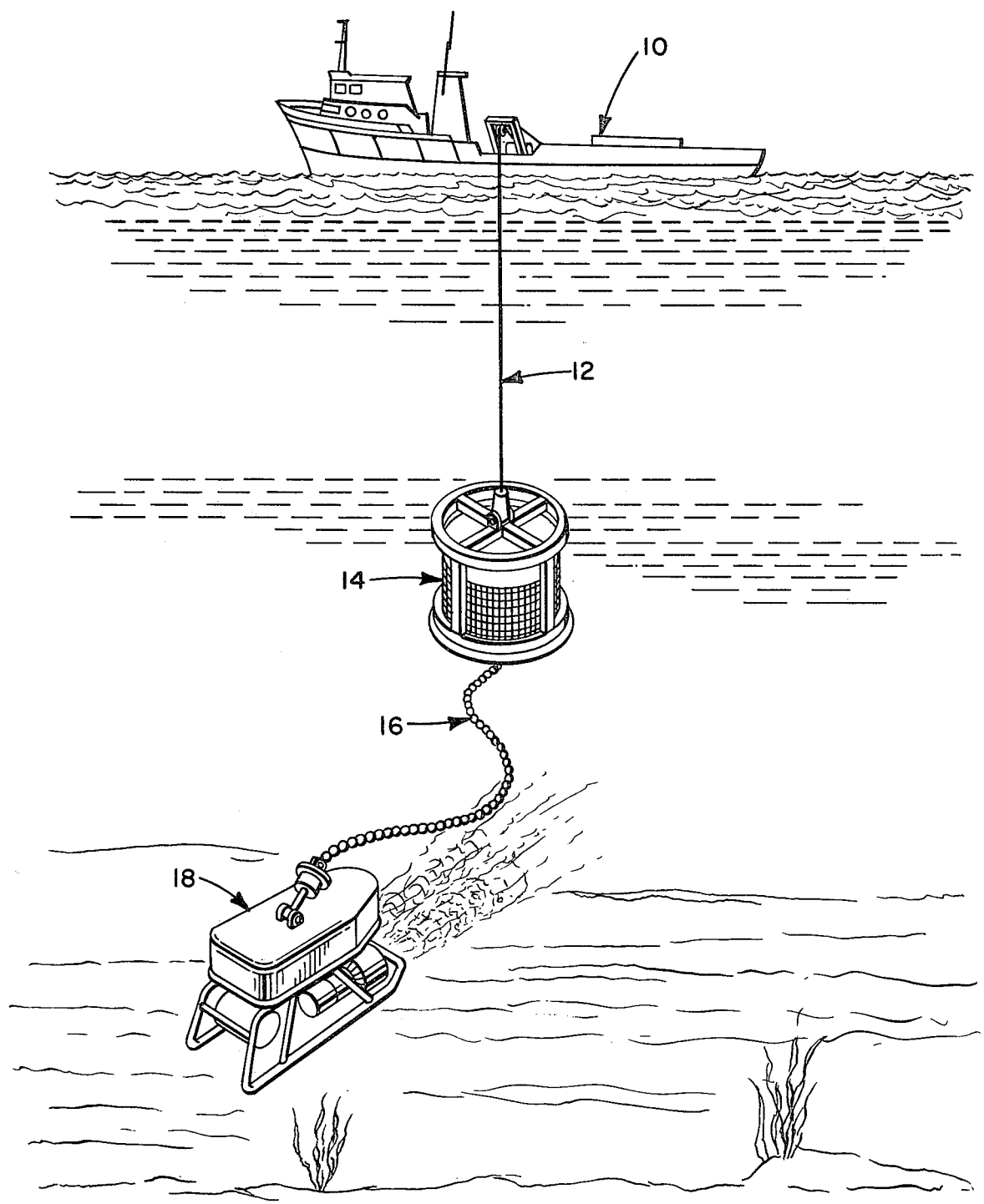
FIG. 1 is an overall perspective view showing the tether tender of the present invention suspended under a surface ship and connected to a remote controlled submarine.

FIG. 1 depicts the tender 14 of the present invention in its normal working environment, that is suspended by a primary tether 12 beneath a surface unit 10, in this case a ship. A secondary tether 16 extends from beneath the tender 14 to supply power to and receive signals from an underwater vessel, in this case a remote controlled submarine 18. The surface unit, primary tether, and submarine 18 will not be described in any further detail since they form no part of the present invention but are shown only for an understanding of the environment of the present invention.

Figure 2:
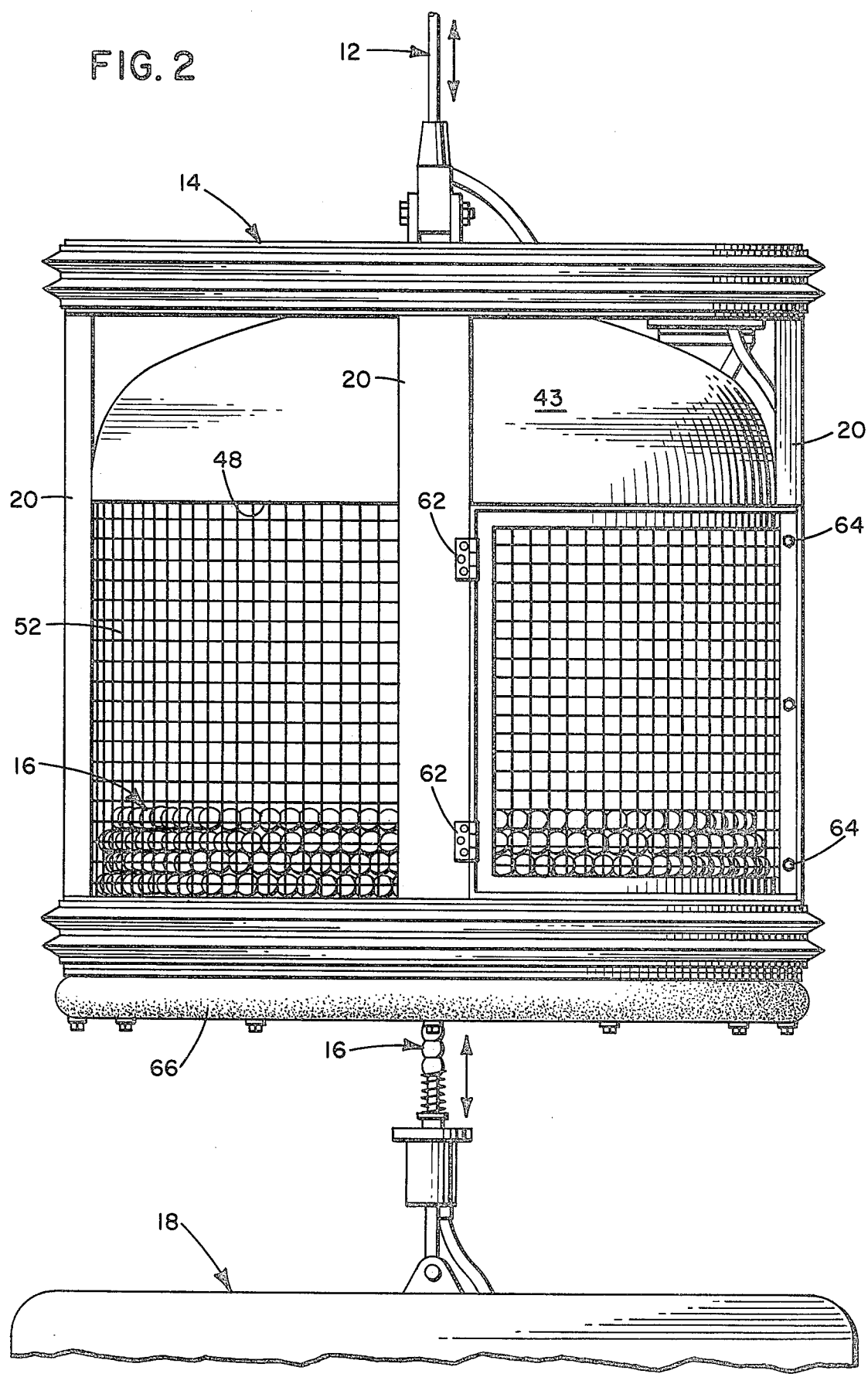
FIG. 2 is an elevational view of the tender positioned slightly above the submarine vehicle.

Turning now to FIG. 2, there is shown a side elevation of the tender 14 of the present invention which, in its simplest terms, may be considered to be a large basket with a special internal contour. When the secondary tether 16 is completely wound within that basket the submarine vehicle 18 is then locked, by suitable means (not shown) underneath the tender so that the entire assembly, tender and submarine, can then be lifted above the surface of the water by means of the primary tether 12. A suitable remote controlled locking mechanism would be used to secure the submarine to the underside of the tender after the cable had been completely wound in.

The secondary tether is a multiconductor cable having an internal strength member. That cable would preferably be neutrally buoyant and protected by "bead" members, this combination being the subject of a separate application for patent by the present assignee, entitled "NEUTRALLY BUOYANT TETHER CABLE" Ser. No. 189,659 filed Sept. 22, 1980.

The tender 14 has frame members 20 which are preferably rust resisting channel iron of sufficient strength to carry not only the weight of the tender with all of the tether wound therein, but also to carry the weight of the submarine vehicle 18 after it has been secured to the underside of the tender for raising to the surface of the water and subsequently aboard the surface unit. The tender is preferably of cylindrical shape and preferably consists largely of open mesh material so that water may pass freely therethrough. It should be weighted so as to hang substantially vertically from the primary tether 12.

Figure 3:
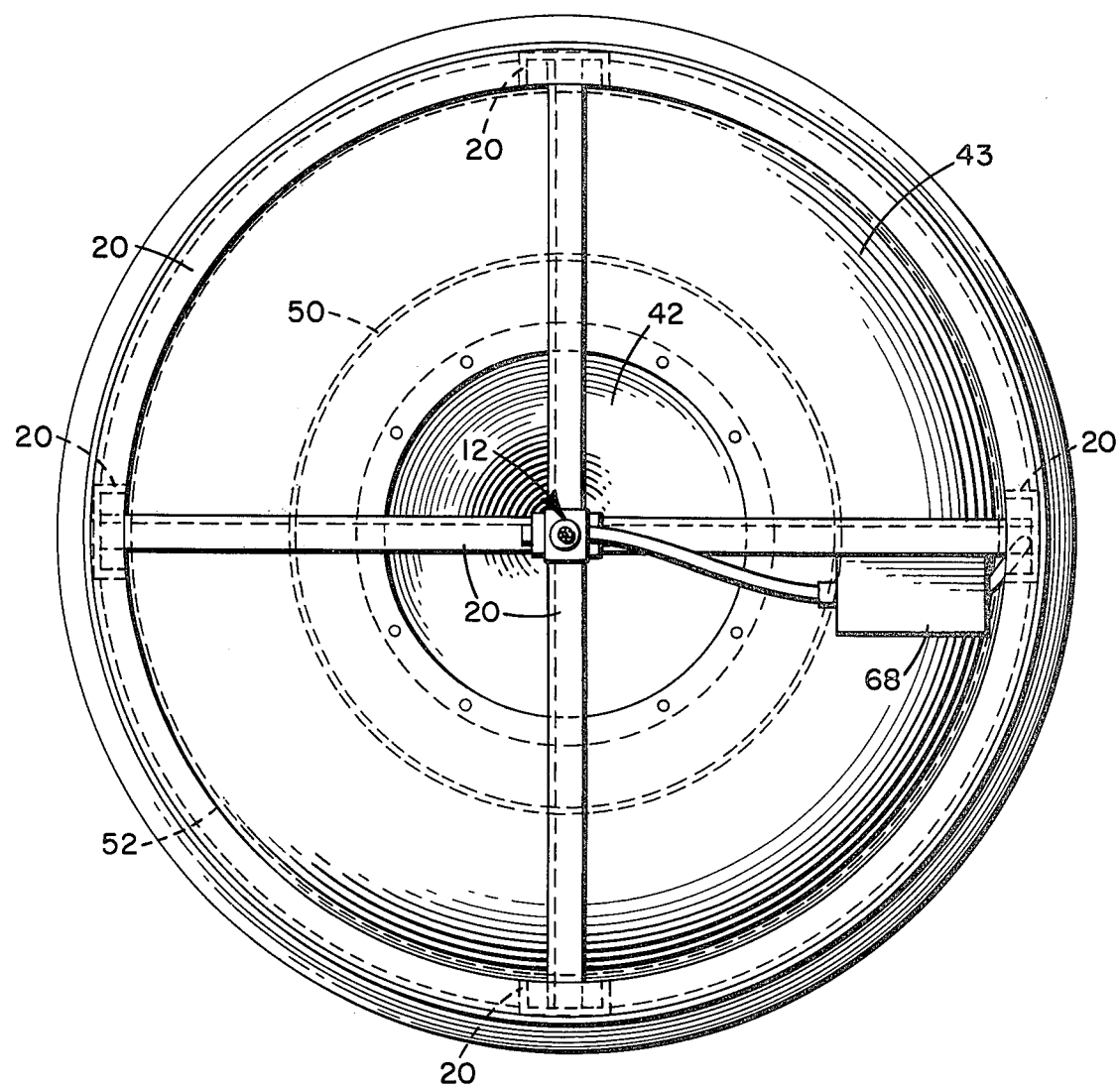
FIG. 3 is a top view of the tender shown in FIG. 2.
Figure 4:
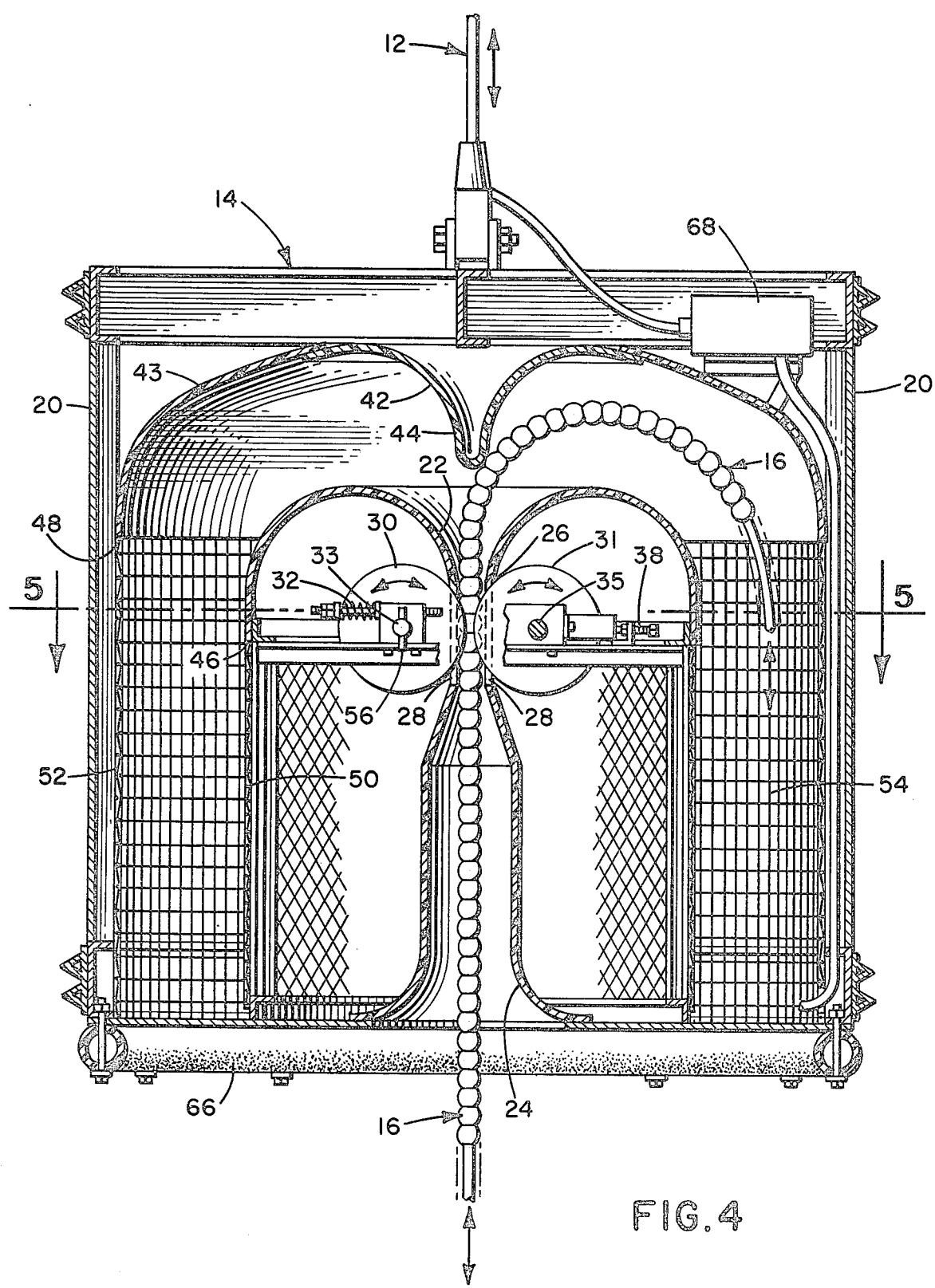
FIG. 4 is a longitudinal sectional view of the tender shown in FIG. 2.

Referring now to FIGS. 3 and 4, the tender has an inner funnel 22, an outer funnel 24 and a narrowed opening therebetween defining a central guide tube 26. This guide tube, open at both ends, is of a diameter slightly larger than that of the cable passing therethrough and has a rectangular opening 28 along each side to accommodate a rubber tired drive wheel 30 or 31 projecting into the tube. Wheel 30 is an idler wheel which is spring biased toward the center of the tube by means of a spring and bolt assembly 32.

Wheel 31 is driven by an underwater electric motor and gear reduction unit 34 through a flexible coupling 36. Wheel 31 may be adjusted in relation to the guide tube by means of an adjusting bolt assembly 38. Drive wheels 30 and 31 preferably have their outer periphery arcuately shaped to accommodate the configuration of the secondary tether as shown at 40 in FIG. 5. Wheels 30 and 31 are mounted for rotation respectively on shafts 33 and 35 which are suitably journaled in bearings which are designed to withstand underwater use.

Above inner funnel 22 is an inner dome which is shaped to have a downwardly projecting nose portion 44 which is spaced directly above and in vertical alignment with the center of the guide tube 26. The nose 44 is rounded with a sufficiently wide radius to prevent its engagement with or snagging of any floats on the secondary tether 16. The spacing between the inner funnel 22 and the inner dome 42 must be carefully controlled, and in a preferred embodiment it has been found that this spacing should be about twice the diameter of a secondary tether cable being passed therethrough or twice the diameter of any floats on that cable. However, in any case, the spacing must be such as to accommodate the normal curvature of that cable and would need to be increased in case of a particularly stiff cable. The cable preferably has its entire surface covered with spherical balls or floats which can rotate around the cable when pushed against the inner dome. If not equipped with such floats, the cable surface is preferably of a material of high surface lubricity such as polyethylene.

The inner funnel 22 is curved outwardly and downwardly in a smooth curve so as to present a smooth path for the tether 16 when being pulled from the annular storage area. The inner surface of the inner dome 42 is similarly smoothly shaped so as to present a smooth, non-snagging, surface over which the cable can pass when it is being forced into the tender and subsequently winds up in the annular storage area 54. The lower edges 46 and 48 are respectively of the inner funnel and inner dome connect respectively to the inner basket wall 50 and the outer basket wall 52 as shown in FIG. 4. Between these walls 50 and 52 there is defined an annular storage area 54 into which the tether cable accumulates as it is forced into the tender by drive wheels 30 and 31 when actuated. The motorgear unit 34 is reversible and can pay out or wind in the cable as directed by remote control from the surface unit.

The special internal contour of the tender as defined between the inner funnel 22 and inner basket wall 50 on the one hand and the inner dome 42 and the outer basket wall 52 on the other hand, causes the cable to store in the basket in coils that do not tangle, similar to the way that an anchor chain or rope behaves in a locker. The tender cable does not necessarily always wind in the same direction, that is in a clockwise direction or a counterclockwise direction, but the winding may reverse in direction from time to time. However, this has been found to present no obstacles to the smooth withdrawal of the tether cable from the tender as needed. It should be noted that the tether cable is not caused to rotate about its own axis in the process of being wound in the tender and that the tender although suspended by a single cable, does not exhibit a tendency to itself rotate when the tether cable is being fed into or out of the tender. The inner dome 42 is preferably covered by an outer dome 43. The inner and outer domes 42,43 and the inner and outer funnels 22,24 are preferably made of fiberglass or plastics material with the surfaces which comes into contact with the cable, and the interior of the guide tube, being smoothly finished to prevent sticking or snagging of the cable. The water within the structure acts as a lubricant for the cable. No attempt is made to prevent entrance of water into the basket with the inner and outer walls 50 and 52 being made of open mesh material such as expanded metal.

Figure 5:
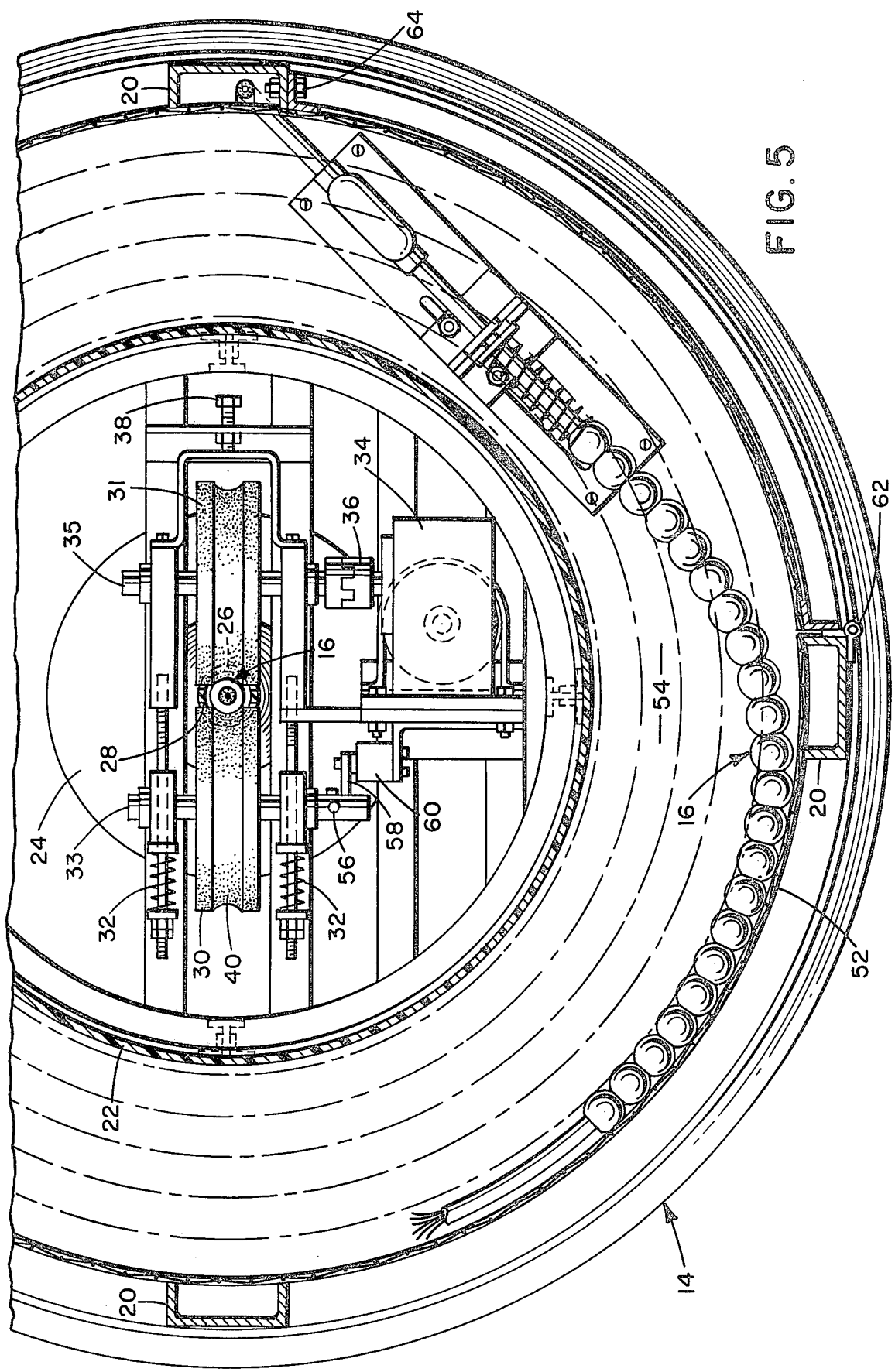
FIG. 5 is a transverse sectional view taken along line 5—5 of FIG. 4.

The operator in the surface unit can keep track of the amount of cable which is payed out at any particular time by means of a counting switch 60 which has an arm 58 that is actuated by a pin 56 projecting from shaft 33 (see FIG. 5). For each revolution of the shaft 33 the counting switch 60 will be actuated, in either the clockwise or counterclockwise direction, so as to indicate to the operator on the surface the amount of cable and its direction of movement.

For ease in servicing the unit at least one section of the outer basket 52 is connected to one of the frame members 20 by means of hinges 62 as shown in FIG. 2. The door thus formed can be held closed by any suitable means, for example by use of bolts 64. The frame is preferably welded together and has, along its lowermost portion, an inflated rubber bumper 66 which is provided for protection of the submarine 18 when it is brought into contact with the underside of the tender. The cable coming down from the surface unit is brought into a suitable waterproof junction box 68 where it is spliced to a secondary tether 16.

In a preferred embodiment the tender is about six feet in diameter, about 6 feet 6 inches high and will easily store 400 feet of tether, that cable having a plurality of floats with an outer diameter of 1½ inches. Adequate reserve storage space is provided in case of twists and turns of the cable.

We claim:

1. A tether tender for paying out and taking in an elongated underwater tether cable comprising a frame member having:

an upwardly facing inner funnel with a generally vertical central guide tube opening and a generally circular periphery outwardly curved therefrom;

a dome member spaced above said inner funnel and having a surface facing downwardly toward said inner funnel with a central projecting portion extending toward said guide tube opening and a generally circular periphery outwardly and downwardly curved therefrom;

an inner wall extending downwardly from said inner funnel periphery and an outer wall extending downwardly from said dome periphery, said inner and outer walls defining an annular storage area therebetween; and power operated tether driving means associated with said central guide tube for frictionally engaging and axially moving an underwater tether cable passing therethrough.

2. The tender of claim 1 in which said driving means is at least one wheel having its periphery projecting into an opening in the side of said guide tube.

3. The tender of claim 1 in which said driving means is two rubber tired wheels, at opposite sides of said guide tube with their peripheries projecting into openings in the tube to engage a tether cable passing therethrough.

4. The tender of claim 3 in which the periphery of at least one of said wheels is of arcuate cross section.

5. The tender of claim 1 in which the central projecting portion of the dome is a rounded nose in vertical alignment with the guide tube and spaced therefrom so that a tether cable moving upward from said guide tube will be diverted radially outward toward the annular storage area.

6. The tender of claim 1 including a downwardly facing outer funnel below the guide tube and shaped to guide a tether cable into the tube.

7. The tender of claim 1 including means on said frame for attachment of a supporting cable thereto.

8. The tender of claim 1 in which the dome and inner funnel are similarly shaped to define a path of substantially constant cross section between them.

9. The tender of claim 8 in which the distance between the dome and inner funnel is approximately twice the outer diameter of a tether cable to be fed therethrough.

10. The tether of claim 1 in which the inner and outer walls are of an open mesh material.

11. A tether tender for paying out and taking in an elongated underwater tether cable comprising:

a frame member having means for attachment to a surface unit;

an upwardly facing inner funnel within said frame with a generally vertical central guide tube opening and a generally circular periphery outwardly curved therefrom;

a dome member spaced above said inner funnel and having a surface facing downwardly toward said inner funnel with a central projecting rounded nose portion extending toward, and in axial alignment with, said guide tube opening; said dome member having a generally circular periphery outwardly and downwardly curved therefrom;

an inner wall extending downwardly from said inner funnel periphery and an outer wall extending downwardly from said dome periphery, said inner and outer walls defining an annular storage space therebetween; a downwardly facing outer funnel at the lower end of said guide tube and shaped to guide a tether cable into the tube;

a rubber tired wheel on opposite sides of said guide tube, the peripheries of said wheels projecting into the tube at a point between said inner and outer funnel so as to engage a tether cable passing therethrough; means for driving at least one of said wheels for moving a cable through the tube.

12. The tender of claim 11 including a counting means coupled to at least one of said wheels to record the revolutions of that wheel.

* * * * *